US008042145B2

(12) United States Patent
Vergoossen et al.

(10) Patent No.: US 8,042,145 B2
(45) Date of Patent: Oct. 18, 2011

(54) METHOD OF CONTROLLING POWER STATES IN A MULTIMEDIA SYSTEM

(75) Inventors: Theodorus Anna Peter Gertrudis Vergoossen, Eindhoven (NL); Bas Driesen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 908 days.

(21) Appl. No.: 12/064,095

(22) PCT Filed: Aug. 18, 2006

(86) PCT No.: PCT/IB2006/052866
§ 371 (c)(1),
(2), (4) Date: Feb. 19, 2008

(87) PCT Pub. No.: WO2007/023437
PCT Pub. Date: Mar. 1, 2007

(65) Prior Publication Data
US 2008/0232209 A1 Sep. 25, 2008

(30) Foreign Application Priority Data
Aug. 23, 2005 (EP) .................................. 05107729

(51) Int. Cl.
*H04N 7/16* (2006.01)

(52) U.S. Cl. ..................................................... 725/151
(58) Field of Classification Search .................. None
See application file for complete search history.

(56) References Cited

U.S. PATENT DOCUMENTS

| 6,593,975 | B1 | 7/2003 | Oh |
| 2006/0209745 | A1 | 9/2006 | MacMullan et al. |
| 2006/0280055 | A1 | 12/2006 | Miller et al. |

FOREIGN PATENT DOCUMENTS

WO 0219078 A2 3/2002

OTHER PUBLICATIONS

HDMI Licensing, LLC: Specification Version 1.2 High-Definition Multimedia Interface, Aug. 22, 2005, pp. 1-214.

*Primary Examiner* — Paul Huber

(57) ABSTRACT

This invention relates to controlling the power states in a multimedia system comprising a multimedia connector box including a multimedia source interconnected to a transmitter module, and a multimedia device including a receiver module interconnected to a multimedia sink, wherein the transmitter and the receiver modules interface the multimedia connector box and the multimedia device via multimedia interfacing means. A signal detector detects the signal activity between the power sources of the multimedia system for determining the current power state of the power sources, and a power switching mechanism adapts the power states of the transmitter and receiving modules to the power states of the power sources.

24 Claims, 14 Drawing Sheets

METHOD OF CONTROLLING POWER STATES IN A MULTIMEDIA SYSTEM

This application is a 371 of PCT/IB2006/052866, filed Aug. 18, 2006.

FIELD OF THE INVENTION

The present invention relates to a method and a system for monitoring and controlling the power states in a multimedia system comprising a multimedia connector box including a multimedia source interconnected to a transmitter module, and a multimedia device including a receiver module interconnected to a multimedia sink, wherein the transmitter and the receiver modules interface the multimedia connector box and the multimedia device via multimedia interfacing means. The present invention further relates to computer readable media for storing instructions for enabling a processing unit to execute the method. The present invention further relates to a communication protocol arranged to implement a power control of the system. The present invention further relates to a mechanism adapted to be implemented in the multimedia system for controlling the power states in the multimedia system and a method performed in the mechanism.

BACKGROUND OF THE INVENTION

Many multimedia systems are interfaced using High-Definition-Multimedia-Interface (HDMI), which provides an interface between any compatible digital audio/video source, such as a set-top box, DVD player, and A/V receiver and a compatible digital audio and/or video monitor, such as a digital television (DTV). Many prior art systems implement HDMI cable to interconnect these devices, e.g. the set-top box and Flat TV. The part that sends the Video/Audio data comprised in the set-top box is often referred to as source and the part that receives the data comprised in the A/V receiver (e.g. the TV) is often referred as the sink. Controlling the sink via the source, or vice verse, is done through the Consumer Electronics Control (CEC) channel, which is an option in the HDMI standard.

The power state of each individual device cannot be monitored in such prior art systems, only the power state of the whole system. Therefore, the power states can only partially be monitored, using the +5V and HPD mechanism. No distinction between ON and STB state is obtained, since in STB the +5V and HPD signal are still communicated.

In the newest/next generation of such multimedia systems where transmitter (TX) and receiver (RX) modules are required as intermediate objects to provide a connection between the source and the sink, where the modules are interfaced via HDMI, the power is much more complicated than in prior art systems. As an example, if the connection between the TX and RX is based on optical or wireless link, special precautions need to be taken since the link might not be transparent for all signals as available in the HDMI cable. Also, since the bandwidth required for the forward links for passing audio/video data from the source to the sink is much higher than the bandwidth required for the backward link from the sink to the source, the power behavior of the system becomes more complicated since the modules most likely have their own power states and may not have a complete transparent view on the peer device, as would be the case when a standard HDMI cable would be used. This puts some requirement on the TX and RX modules in order to implement a consistent power behavior. Also, the power state control via CEC command coupled to RC reception is not defined in any standard.

BRIEF DESCRIPTION OF THE INVENTION

The object of the present invention is to overcome the above mentioned drawbacks by providing a method of controlling the power states in such multimedia systems.

A further object is to provide a mechanism and a system for controlling the power states in such multimedia systems.

Another object is to provide a communication protocol to implement a power control of a multimedia system.

According to one aspect the present invention relates to a method of detecting and controlling the power states in a multimedia system, the system comprising a multimedia connector box including a multimedia source interconnected to a transmitter module and a multimedia device including a receiver module interconnected to a multimedia sink, wherein the transmitter and the receiver modules are interfaced via multimedia interfacing means, comprising:

on the connector box side;
  determining the power state of the multimedia source,
  switching the power state of the transmitter module to the same power state as determined for the multimedia source,
  wherein information indicating the current power state of the multimedia source is provided to the receiver module; and
on the multimedia device side;
  switching the power state of the receiver module to the same power state as determined for the multimedia source.

In an embodiment, the method further comprises on the multimedia device side;
  determining the power state of the multimedia sink,
  switching the power state of the receiver module to the same power state as determined for the multimedia sink,
  wherein information indicating the current power state of the multimedia sink is provided to the transmitter module; and
on the connector box side;
  switching the power state of the transmitter module to the same power states as determined for the multimedia sink.

It follows that the power states for each respective device comprised in the multimedia system can be monitored. Based thereon the power states of the transmitter and receiver modules are adapted to the power states of the power sources, i.e. a consistent power behavior is obtained in the multimedia system since the power state of the transmitter and the receiver modules follow same power state of the power sources. Therefore, if the power state of the power sources is determined to be e.g. low power stand-by mode (STB), the power state of the transmitter and receiving modules will be switched to low power STB mode (if it was previously in different power state). The result is that the power dissipation in the system will be minimized, and simultaneously the power behavior of the multimedia system be harmonized. In the following, the term source refers to the a part of the multimedia connector box that send the A/V data, and the term sink refers to the part of the multimedia device that receives and presents the A/V data to a user, e.g. a TV screen, Monitor, a speaker etc. Within this patent application the term power sources refers to the multimedia source and sink devices in a multimedia system.

In one embodiment, the step of providing information to the receiver module and/or the transmitter module indicating the current power state of the multimedia source comprises transmitting data indicating the current power state of the multimedia source to the receiver module. In another embodiment, the step of providing information to the receiver module and/or the transmitter module indicating the current power state of the multimedia source is based on the signal activity at the transmitter module or the multimedia source, wherein the receiver module is adapted to automatically detect the signal activity and based thereon determined the current power state of the transmitter module. In that way, the modules can be informed in an effective way about the current power state of the power sources.

In an embodiment, the step of determining the power state comprises detecting the signal activity either on the High-Definition-Multimedia-Interface Transition-Minimized-Differential-Signaling (HDMI TMDS) lines, the clock line or the Consumer Electronics Control (CEC) line.

In an embodiment, the step of detecting the signal activity of the power sources for the multimedia system comprises detecting the activity either on the High-Definition-Multimedia-Interface Transition-Minimized-Differential-Signaling (HDMI TMDS) lines, the clock line or the Consumer Electronics Control (CEC) line. In an embodiment, if the detected signal activity results that no activity is detected over a predefined time interval the power state of the power sources is determined to be in stand-by state (STB) or off state (OFF), otherwise the power state of the power sources is determined to be in on state (ON). In that way, a very clear indicator is obtained indicating the current power state of the power sources. Accordingly, if no activity is detected for a time period t, the transmitter and receiving modules will be switched from ON state (assuming this was the current state) to STB or OFF state, whereas if an activity is detected the transmitter and receiving modules will be switched to an ON state.

In another aspect the present invention relates to a computer readable media for storing instructions for enabling a processing unit to execute the above method steps.

In still another aspect the present invention relates to a communication protocol arranged to implement a power control of a multimedia system comprising a multimedia connector box including a multimedia source interconnected to a transmitter module and a multimedia device including a receiver module interconnected to a multimedia sink, wherein the transmitter and the receiver modules are interfaced via multimedia interfacing means, wherein information indicating the current power state of the multimedia source are provided to the receiver module, or vice verse, information indicating the current power state of the multimedia sink are provided to the transmitter module, wherein the information are used for harmonizing the power mode of the system. In an embodiment, the interface medium comprises a wired connection, optical connection or wireless connection.

In an embodiment, the information provided in the communication protocol is by sending +5V signal state and a HPD signal state across the optically or wirelessly medium.

In yet another aspect the present invention relates to a system adapted for detecting and controlling the power states in a multimedia system, the system comprising a multimedia connector box including a multimedia source interconnected to a transmitter module and a multimedia device including a receiver module interconnected to a multimedia sink, wherein the transmitter and the receiver modules are interfaced via multimedia interfacing means, comprising:

on the connector box side;
a power detector adapted determine the power state of the multimedia source,
a switching mechanism adapted to switch the power state of the transmitter module to the same power state as determined for the multimedia source,
wherein information indicating the current power state of the multimedia source is provided to the receiver module;
on the multimedia device side;
a switching mechanism adapted to switch the power state of the receiver module to the same power state as determined for the multimedia source.

In an embodiment, the multimedia interfacing means comprises High-Definition-Multimedia-Interface (HDMI), or digital uncompressed video and audio interfacing means.

In an embodiment, the transmitter and receiving modules are connector together either optically or wirelessly.

In an embodiment, the system further comprises a stand-by mechanism implemented in the connector box and display and which is independent of the multimedia interfacing means and the transmitter and the receiver modules), wherein either the connector box or the display takes up the role as master and where the master puts the slave in standby by using a predefined handshake mechanism over a predefined communication protocol.

In an embodiment, the connector box acts as a master and multimedia device as a slave.

In an embodiment, a handshake is used to go to stand-by mode and to come out of the stand-by mode. As an example, a CEC (Consumer Electronics Control) handshake could be used to go to stand-by mode and to come out of the stand-by mode.

In yet another aspect, the present invention relates to a mechanism adapted to be implemented in a multimedia system for controlling the power states in the system, the system comprising a multimedia connector box including a multimedia source interconnected to a transmitter module and a multimedia device including a receiver module interconnected to a multimedia sink, wherein the transmitter and the receiver modules are interfaced via multimedia interfacing means, comprising:

a power detector adapted to detect the power state of the multimedia source or sink, and
a power switching mechanism adapted to switch the power state of the transmitter or receiver modules to the same power state as detected for the multimedia source or sink.

In an embodiment, the mechanism is further adapted to send +5V signal state and Hot-Plug-Detect (HPD) signal state across the multimedia interfacing means.

In yet another aspect, the present invention relates to a method performed in a mechanism, where the mechanism is adapted to be implemented in a multimedia system for controlling the power states in the system, the system comprising a multimedia connector box including a multimedia source interconnected to a transmitter module and a multimedia device including a receiver module interconnected to a multimedia sink, wherein the transmitter and the receiver modules are interfaced via multimedia interfacing means, comprising:

detecting the power state of the multimedia source or sink, and
switching the power state of the transmitter or receiver modules to the same power state as detected for the multimedia source or sink.

The aspects of the present invention may each be combined with any of the other aspects. These and other aspects of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
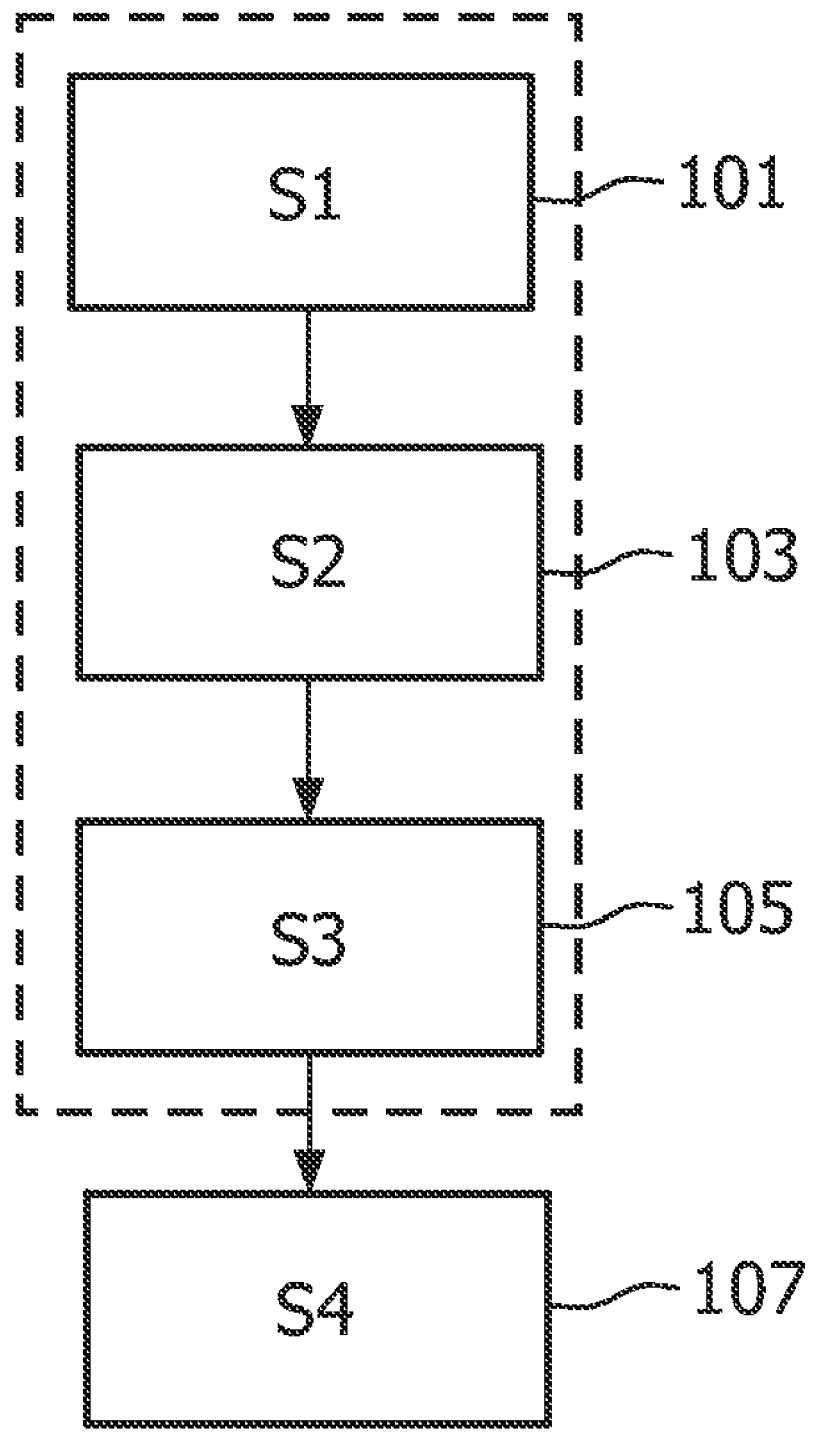
FIG. 1 shows one embodiment of a method according to the present invention of controlling the power states in a multimedia system.

FIG. 1 shows a method according to the present invention of controlling the power states in a multimedia system comprising a multimedia connector box including a multimedia source interconnected to a transmitter module (TX), and a multimedia device including a receiver module (RX) interconnected to a multimedia sink, wherein the TX and the RX are interfaced via multimedia interfacing means, such as optical or wirelessly based High-Definition-Multimedia-Interface (HDMI) connection. Such a multimedia system can comprise compatible digital audio/video source, such as a set-top box, DVD player, and A/V receiver and a compatible digital audio and/or video monitor, such as a digital television (DTV).

In a preferred embodiment, the TX and RX are powered through the source and the sink, but an external AC/DC could just as well be used as a power source.

Referring to the flow chart in FIG. 1, steps (S1)-(S4) apply to the connector box side, and step (S5) to the multimedia device side. However, this could of course be reversed so that steps (S1)-(S4) apply to the multimedia device side and (S5) to the connector box side.

In the first step the power state of the multimedia source is determined (S1) 101 by e.g. detecting the signal activity between the multimedia source and the transmitter module. The signal activity may e.g. be detected either on the High-Definition-Multimedia-Interface Transition-Minimized-Differential-Signaling (HDMI TMDS) lines, the clock line or the Consumer Electronics Control (CEC) line. Based on the detected power state the power state of the transmitter module is switched to the same power state as detected for the multimedia source (S2) 103. Information indicating the current power state of the multimedia source must then be provided to the receiver module (S3) 105. The step of providing the information (S3) 105 comprises in one embodiment transmitting data indicating the current power state of the multimedia source to the receiver module. In another embodiment the provided information are based on the signal activity at the transmitter module or the multimedia source, wherein the receiver module is adapted to automatically detect the signal activity and based thereon determined the current power state of the transmitter module.

Based on the information (S4) 107 the power state of the receiver module is switched to the same power state (if it not in the same power state) as determined for the multimedia source.

Figure 2:
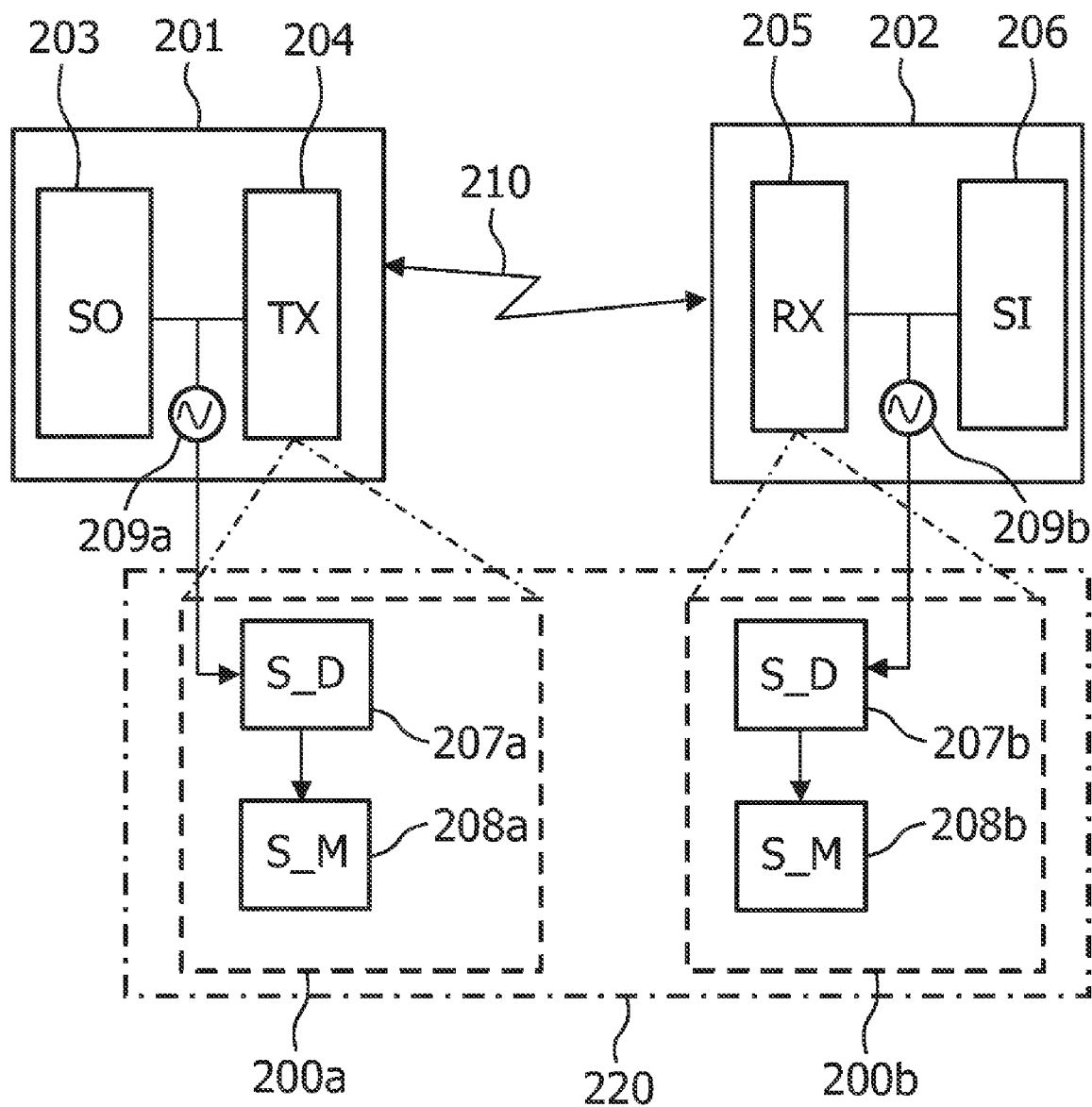
FIG. 2 shows a power control system for controlling the power states in a multimedia system.

FIG. 2 shows an embodiment of a system 220 according to the present invention comprising mechanism 200a and 200b. The mechanism are adapted to detect and control the power states in a multimedia system comprising a multimedia connector box 201 including a multimedia source (SO) 203 interconnected to a transmitter module (TX) 204, and a multimedia device 202 including a receiver module (RX) 205 interconnected to a multimedia sink (SI) 206, wherein the TX and RX are interfaced via multimedia interfacing means 210. The multimedia interfacing means 210 can e.g. comprise a wired, or wireless connection or optical link. The mechanism 200a, 200b which in this embodiment are integrated into the TX and RX modules comprise a power detector (207a), which in this embodiment is a signal detector 207a, 207b, and a power switching mechanism 208a, 208b. The signal detectors 207a, 207b detect the signal activity 209a between the TX 204 and the multimedia sink (SI) 206, and the RX 205 and the multimedia sink (SI) 206, respectively. The detected signal activity 209a, 209b is then used for determining the current power state of the power sources of the multimedia system; in this case the multimedia sink (SI) 206 and the multimedia sink (SI) 206. The power switching mechanism (S_M) 208a, 208b is adapted to switch the power states of the TX 204 and RX 205 modules to the same power states as determined for the power sources, i.e. to the same power states as the multimedia sink (SI) 206 and the multimedia sink (SI) 206. Various scenarios of switching the power states from on power state to another power state will be discussed in more details later.

Figure 3A:
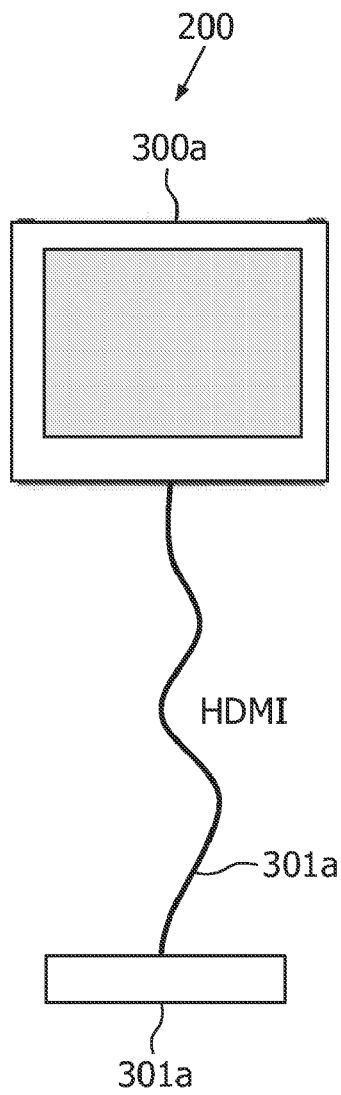
FIG. 3 illustrates graphically typical setups of an example of a multimedia system from FIG. 2.
Figure 3B:
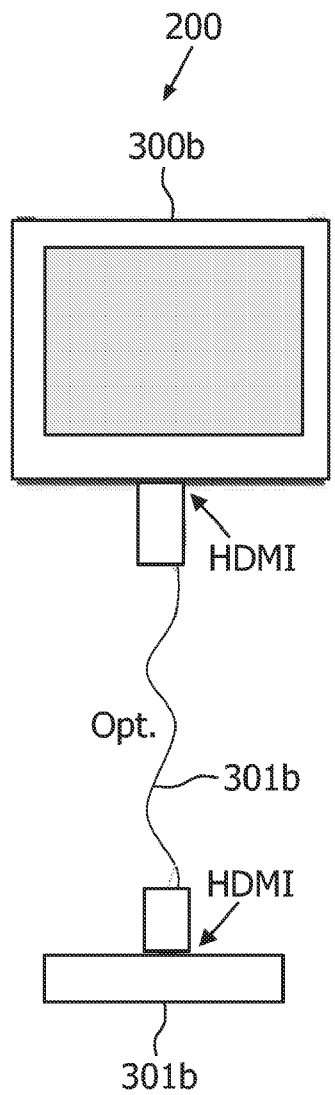
Figure 3C:
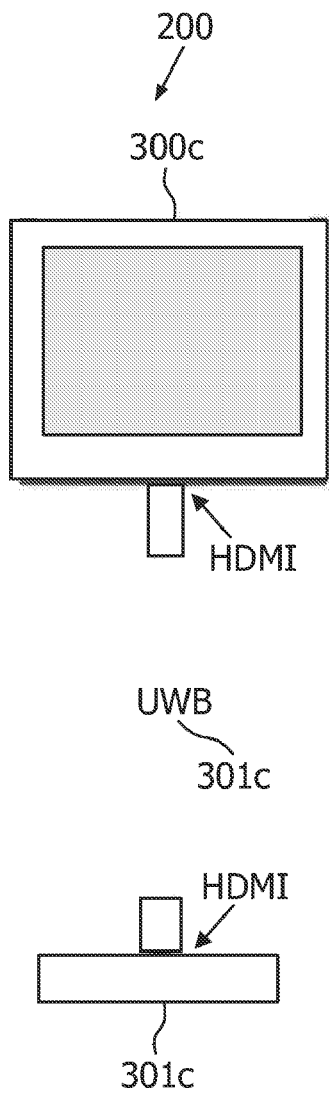

FIG. 3 illustrates graphically examples of setups for a multimedia system 210 from FIG. 2, where in this example the multimedia system 210 comprises an E-Box 301a-301c/Display 300a-300c combination using a HDMI based connection. FIG. 3a illustrates a scenario where a standard HDMI cable 301a is used, e.g. a standard physical copper connection, FIG. 3b shows where an optical bidirectional TX/rx module, optical fiber and optical bidirectional RX/tx module, shortly denoted as optical link 301b is implemented, and FIG. 3c shows a setup consisting of an wireless TX/rx module and a wireless RX/tx module, shortly denoted as wireless link 301c.

Figure 4:
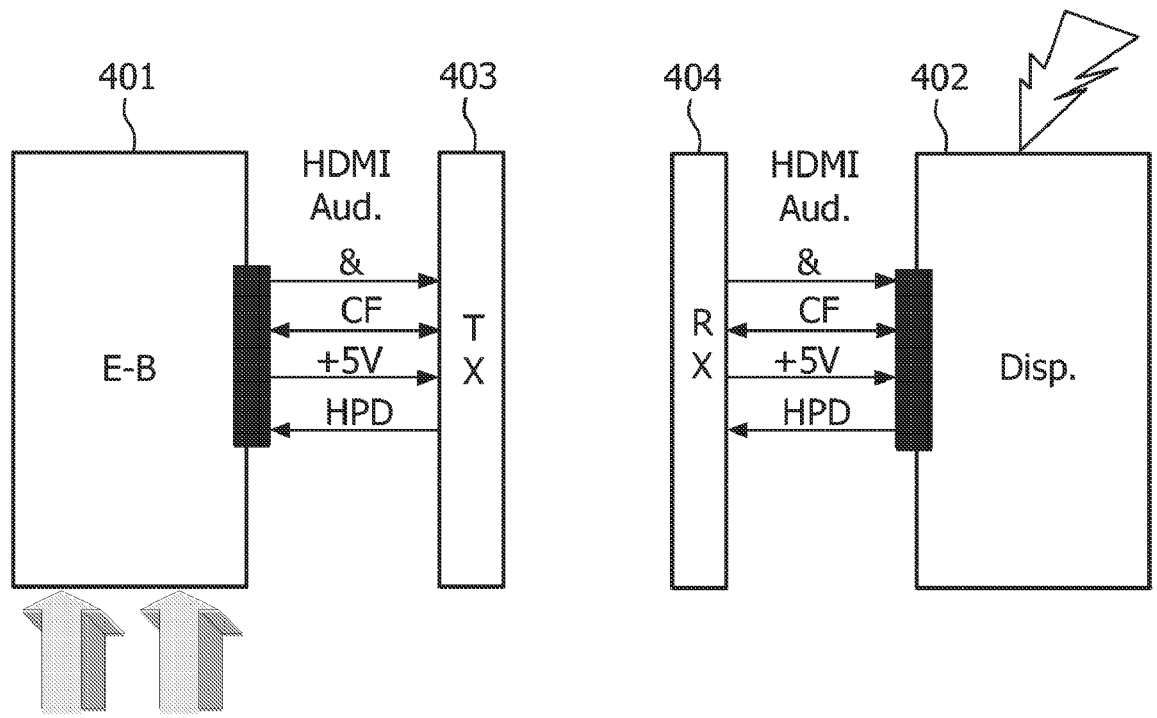
FIG. 4 shows a schematic diagram of such an Ebox (E-B)-Display (Disp.) combination in more details.

As mentioned previously, the part that sends the video and audio data is referred to as the source and the part that receives the video and audio is referred to as the sink. Controlling the sink via the source or the other way around is typically done through the CEC (Consumer Electronics Control) channel, which is an option in the HDMI standard. In the second and third setup, special precautions need to be taken since the link might not be transparent for all signals as available in the HDMI cable. FIG. 4 shows a schematic diagram of such an Ebox (E-B) 401/Display (Disp.) 402 combination in more details.

Here below, the optical and wireless bi-directional TX and RX modules are sometimes referred to as TX/rx and RX/tx since both the modules are preferably transceiver modules, i.e. have both transmit and receive functionality, though the main functionality of the one connected to the source is the transmit mode and the main functionality of the one connected to the sink is the receive mode. TX has the highest throughput in forward direction and RX has the highest throughput in backward direction. The reason for calling it TX and RX modules is the fact that the bandwidth required for the forward link is much higher than the bandwidth required for the backward link. The forward link is used for passing video, audio and control data, as the backward link is only used for passing control data.

Having active TX 403 and RX 404 modules between the connector box, e.g. an E-Box (E-B) 401 and Display (Disp.) 402 makes the power behavior more complicated. This is due to the fact the modules 403, 404 most likely have their own power states and may not have a complete transparent view on the peer device (as would be present when using a physical cable). This puts some extra requirements on the TX and RX modules in order to implement a consistent power state behavior. Also the power state control via CEC commands coupled to RC reception is not defined in any standard.

In an embodiment, the invention is based on implementing a software control in the E-Box (connector box) 301*a*-301*c* and Display 300*a*-300*c*, but also in the TX and RX modules 403, 204, 404, 205. In the embodiment shown in FIG. 4, the Display (Disp.) 402 also contains a controller for RC decoding and power control.

The invention can advantageously be applied in Flat TV products in which it is important to have a slim and thin display and also to have a high quality video link and audio between E-Box and Display.

Figure 5:
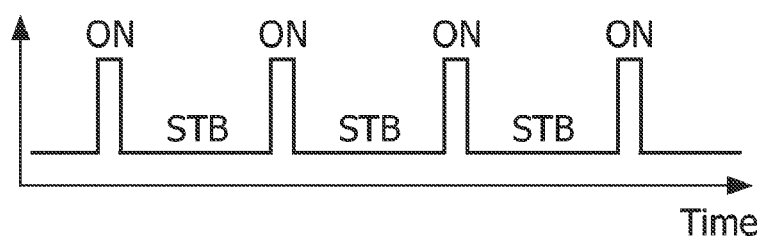
FIG. 5 shows power consumption for a TX and RX modules as a function of time in the case the modules are in low power STB mode.

In general, the optical or wireless TX and RX 403, 204, 404, 205 are powered either through an external AC/DC converter or through the source and the sink 203, 206. In case the power is supplied through the source and the sink 203, 206, the optical 301*b* and wireless 301*c* TX 204, 403 and RX 205, 404 modules are switched off at the same time the source and the sink devices are switched off. Next to the OFF state the system has a STB and ON state. In STB the system is in lower power mode and dissipation is low, since in low power mode no video and audio are transferred. In the ON state the source and sink and link modules are active. Typically, the ON state can only be reached when the previous state of the source and sink are STB. The OFF state can either be reached through the OFF switch or through pulling the power plug from the power outlet. The default state of the source and sink 203 is STB. The TX and RX link modules 403, 204, 404, 205 also have a STB and ON state defined as well. The TX and RX link modules need to be able to wake up from the STB state upon CEC activity or audio and video activity. That is they need to detect activity either on the HDMI TMDS lines or the clock line and the CEC line. The switching mechanism (S_M) 208 shown in FIG. 2 needs to be in place to move the TX and RX link modules 204, 205, 403, 404 from the ON state into the STB state, based upon the detected activity by the signal detector (S_D) 207 shown in FIG. 2. After a certain quiet period with no activity on any of the lines that are monitored the TX and RX link modules should switch from the ON state to the STB state. In STB the TX and RX link modules 403, 204, 404, 205 should, in one embodiment, be able to retain the +5V signal and the HPD (Hot Plug Detect) signal, even though the link operates in lower power consumption mode. There are at least two approaches to fulfill this requirement, which are given below as examples. The first approach is maintaining a secondary bidirectional low speed/power link between the TX and RX link modules 403, 204, 404, 205 and switching OFF the high speed unidirectional primary link. The second approach applies to TX and RX link modules 403, 204, 404, 205 that are not equipped with a bidirectional secondary link, but have only a unidirectional forward link and a unidirectional (could be low speed) backward link. In this situation +5V signal and the HPD signal can be retained when the actual state of the +5V and the HPD signal are every so often sent across the link. This is illustrated graphically in FIG. 5 showing the power consumption as a function of time. Accordingly, in STB the forward as well as the backward link are switched OFF, though every so often the forward as well as the backward link are switched ON, to enable sending across the state of the +5V and the HPD lines. The time period between switching ON and OFF should be low enough for the system to behave symmetrical and should be long enough to keep the STB power dissipation of the TX and RX link modules as low as possible. The source goes to STB whenever the HPD signal is de-asserted. The HPD signal will be de-asserted when either the sink is switched OFF, the RX link module is disconnected from the sink or the TX link module is disconnected from the source.

The sink goes to STB whenever the +5V signal is de-asserted. The +5V signal will be de-asserted when either the sink is switched OFF, the TX link module is disconnected from the sink or the RX link module is disconnected from the sink.

The +5V and the HPD signal do not switch the source or the sink from STB to the ON state. This cannot be done, since it is in conflict with the HDMI standard. In system STB, having the source, sink, TX link module and RX link module in STB, the levels of the +5V signal and the HPD signal need to be retained.

Switching the system from STB to ON can only be done through an awake-able RC command or the local keypad on either the source or the sink. The RC RX can be either positioned on the source or the sink, but the favored position is the sink. In the following the RC RX is positioned at the sink, which is the case in the TV split architecture system. The above is an example and other mechanism can be defined to switch the system from STB to the ON state.

Figure 6:
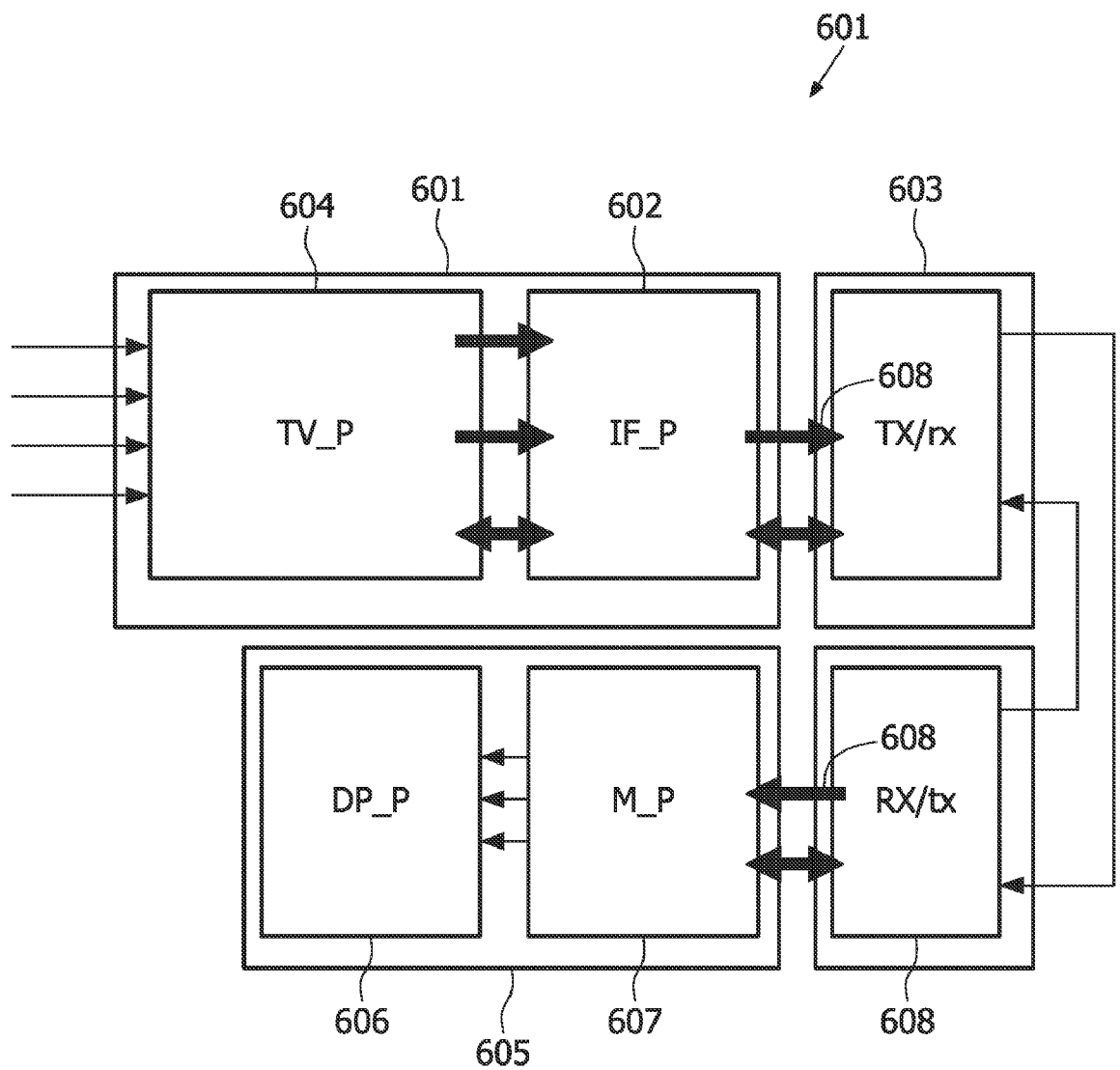
FIG. 6 depicts an embodiment of a multimedia system.

FIG. 6 depicts an example of a multimedia system 600 showing a connector box 601 comprising a TV platform (TV_P) 604 and an interface platform (IF_P) 602 and a transmitter module (TX/rx) 603 interconnected to the connector box, and a monitor 605 comprising a display platform (DP_P) 606 and a monitor platform (M_P) 607 interconnected to a receiver module (RX/tx) 608. Normally, the TV platform 604 resides in the display but is now positioned in the connector box 604. The only connection going from the connector to the monitor 605 is the HDMI-based link 608, which can be a plain HDMI cable, an optical link or a wireless link, as mentioned previously. All external connections are made to the connector box 601 and are being processed inside the connector box 601. At the other side the connector box outputs a fixed video and audio format. This format undergoes some final backend processing before being put on the display 606, a final scaling step can be part of that. In an embodiment, the fixed video format is chosen to be 1280×720 p @ 60 Hz, mainly because the wireless link might not support higher resolution at this point of time. Final scaling to 1920×1080 p@60 Hz will be done in the display.

Next, the different power state and startup behavior as already explained above are being described in more detail with the support of flow diagrams shown in FIGS. 7-8 and 10-16. The different scenarios that will be described are listed in table 1 shown here below.

TABLE 1

| | Sink | | Source | |
|---|---|---|---|---|
| | Initial State | End State | Initial State | End State |
| 1 | ON | OFF | ON | STB |
| 2 | OFF | STB | STB | STB |
| 3 | OFF | STB | OFF | OFF |
| 4 | ON | STB | ON | OFF |
| 5 | STB | STB | OFF | STB |
| 6 | OFF | OFF | OFF | STB |
| 7 | STB | ON | STB | ON |
| 8 | ON | STB | ON | STB |
| 9 | STB | STB | STB | STB |

Figure 7:
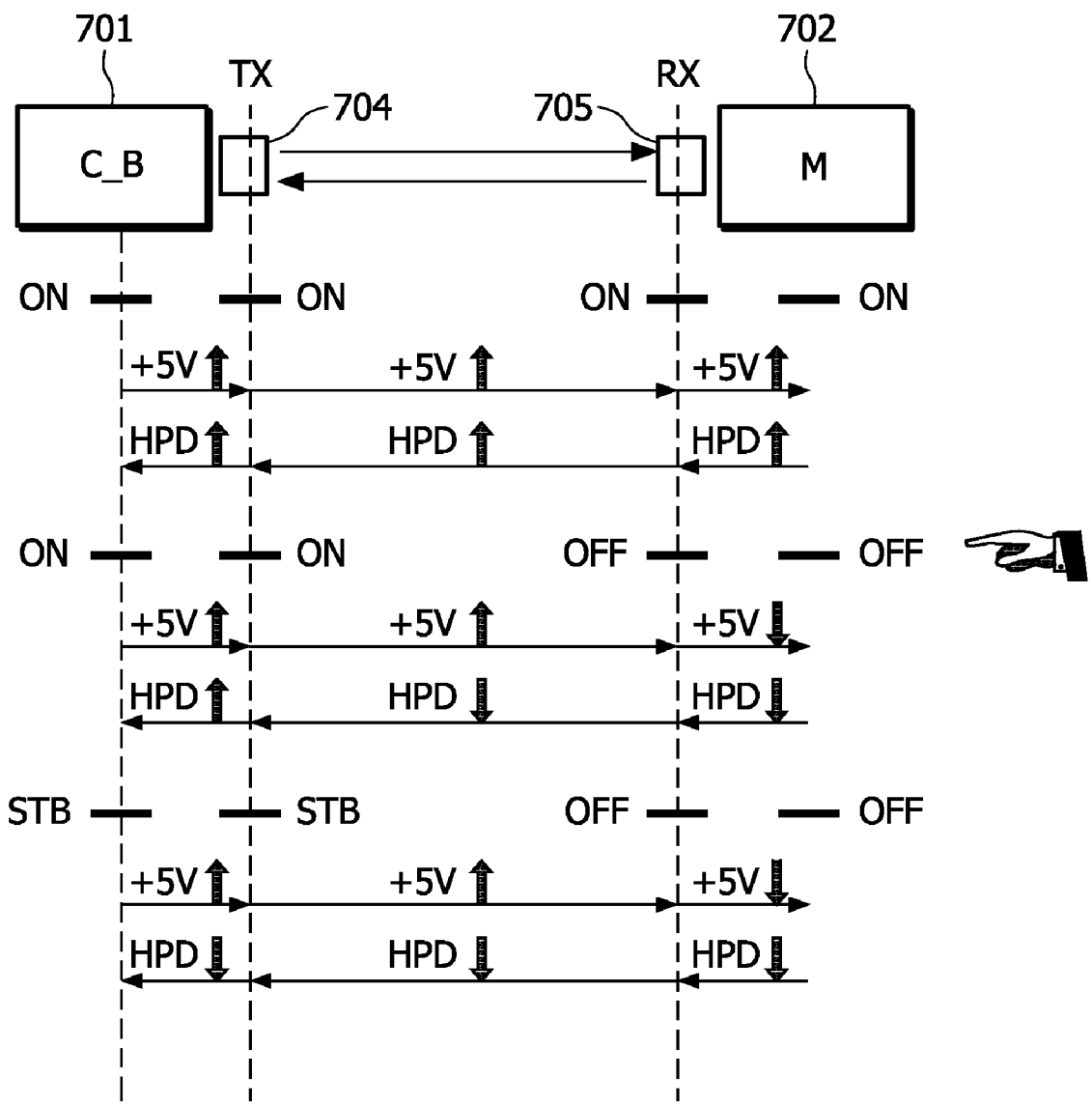
FIGS. 7 and 8 show flow diagrams showing different scenarios between the state change of the source, sink and the TX and RX links.

FIG. 7 illustrates a flow diagram showing a state change of the source (So.) comprised in a connector box (C_B) 701 and sink (Si.) comprised in a monitor (M) 702 and the TX 704 and RX 705 link modules in the case of scenario 1, which can be traced back to table 1. This flow diagram depicts the scenario where the sink is switched from an ON power state to an OFF power state.

It is important to notice that the RX 705 link module is powered OFF at the same time as the sink is. In this case the RX module is powered through the sink. In the case the RX module is powered through an external AC/DC adapter the module would instead of going to the OFF state go to the STB state. A certain time later the TX 704 link module detects the absence of the HPD signal and on his turn de-asserts its HPD signal to the source, which can than switch to STB. The link TX module should then in the absence of audio/video and CEC activity switch to STB at a given time. It should periodically try to send the +5V state to the RX link module. The RX link module in this case does not respond, since it is powered OFF.

Figure 8:
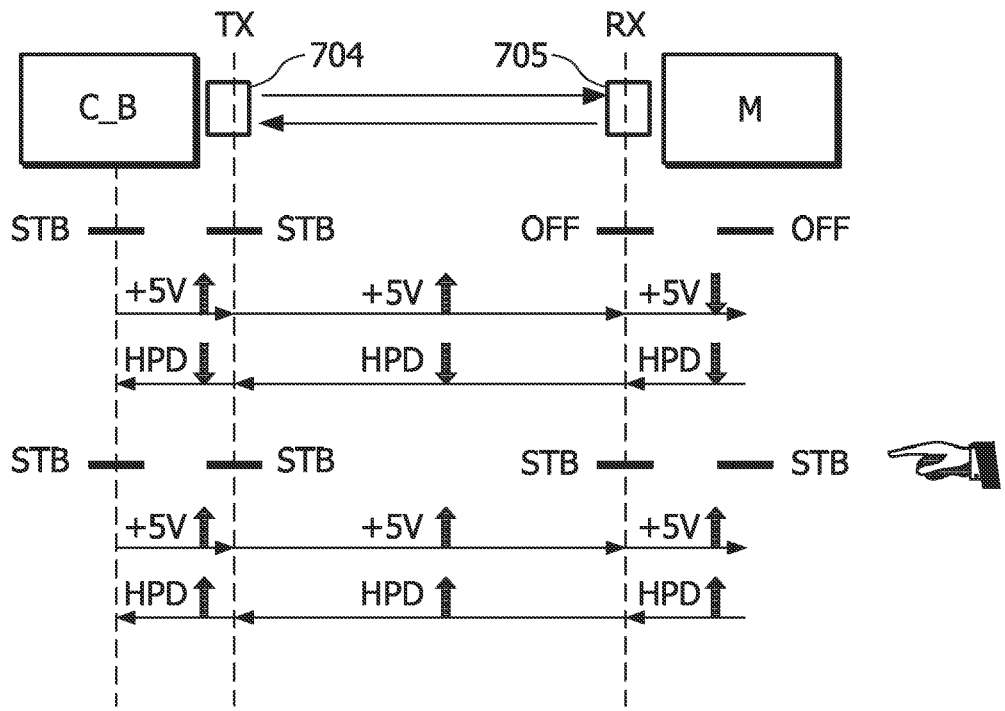
Figure 9A:
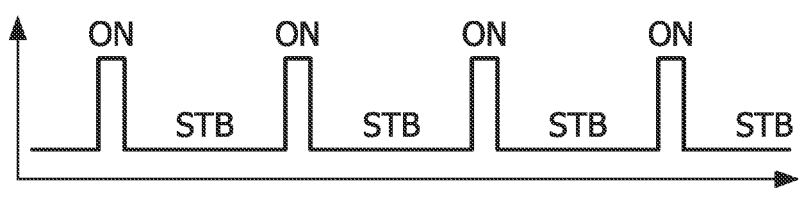
FIGS. 9a and 9b show the power consumption between TX and RX modules as a function of time, in the case the modules are in low power STB mode.
Figure 9B:
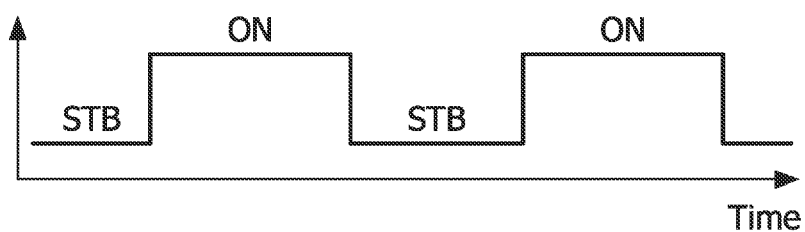

FIG. 8 illustrates another flow diagram showing the state change of the source, sink and the TX and RX link modules in the case of scenario 2, which can be traced back to table 1. In case the monitor is activated the default state is STB. This flow diagram depicts the scenario where the sink is switched from an OFF power state to the STB power state, when the source is in STB power state. As before, the TX 704 link module will continue to regularly send the +5V state across as illustrated in FIG. 9a. The RX 705 link module will initially be either in STB or ON, to be able to detect the +5V signal and with it the availability of the source and the TX 704 link module. Upon reception of the +5V state it will forward it to the sink. The sink on his turn will assert the HPD signal and the RX link module will send the state of the HPD signal to the TX link module. It does this either remaining in STB mode or shortly switching to the ON state and immediately going back to the STB state. The TX link module and RX link module should regularly send the +5V signal and the HPD state to each other. It is assumed that the TX 704 and RX 705 link module are able to receive the +5V and HPD state in the low power STB state, but that they might need to be powered ON to transmit +5V and HPD state. If the TX and RX link module are not able to receive the +5V or HPD state in the low power STB state, then the TX and RX link module should be switched ON regularly to listen (see FIG. 9b) for the possible arrival of the signals before going back to their STB state. The listen period shown in FIG. 9b should at least be as long as the time interval between two state communications. In case the TX and RX module are exactly synchronized in time, the listen period can be reduced to the same as in FIG. 9a.

Figure 10:
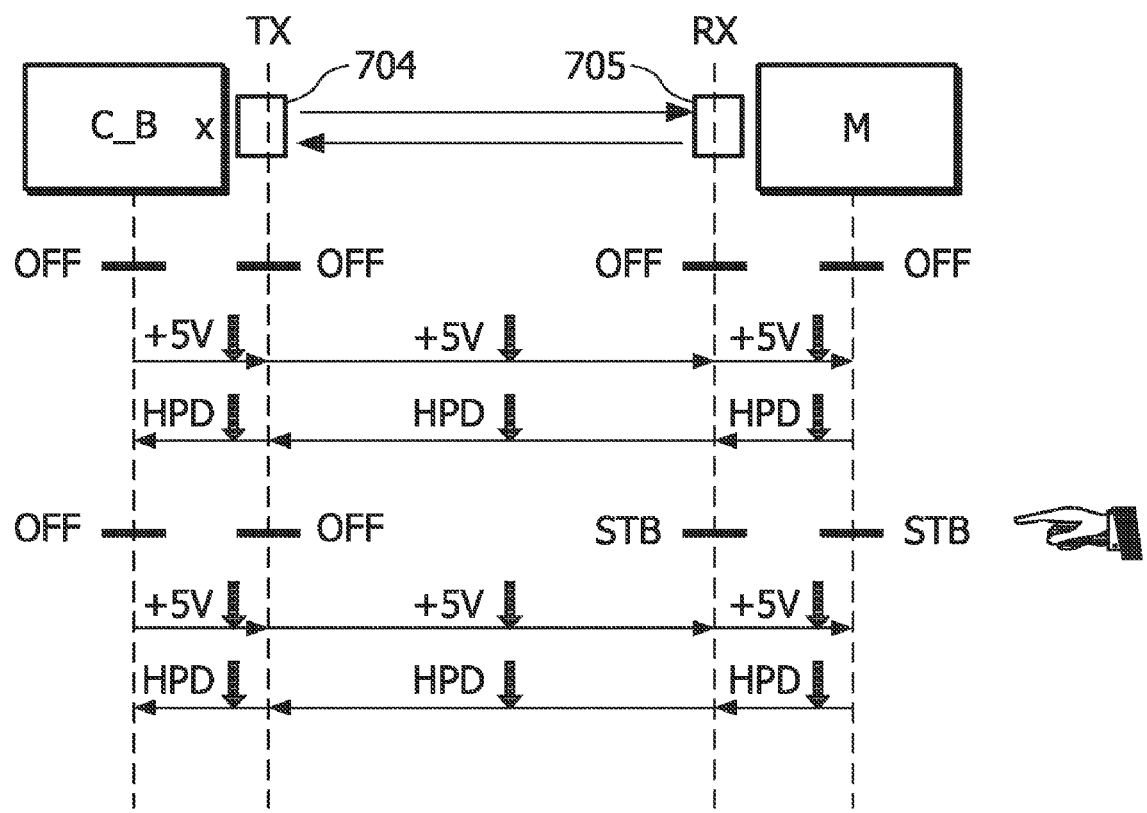
FIGS. 10-16 depict different scenarios between the state change of the source, sink and the TX and RX links.

FIG. 10 shows a flow diagram of the state change of the source, sink and the TX 704 and RX 705 link modules in the case of scenario 3, which can be traced back to table 1. This flow diagram depicts the scenario where the sink is switched from an OFF power state to a STB power state, when the source is in OFF.

In the case the complete system is in the OFF state and the sink is activated, it will default go to STB. The same applies to the RX 705 link module. If the RX link module is not able to listen when in STB, then the RX 705 link module should regularly go to the ON state to listen to possible state communication.

Figure 11:
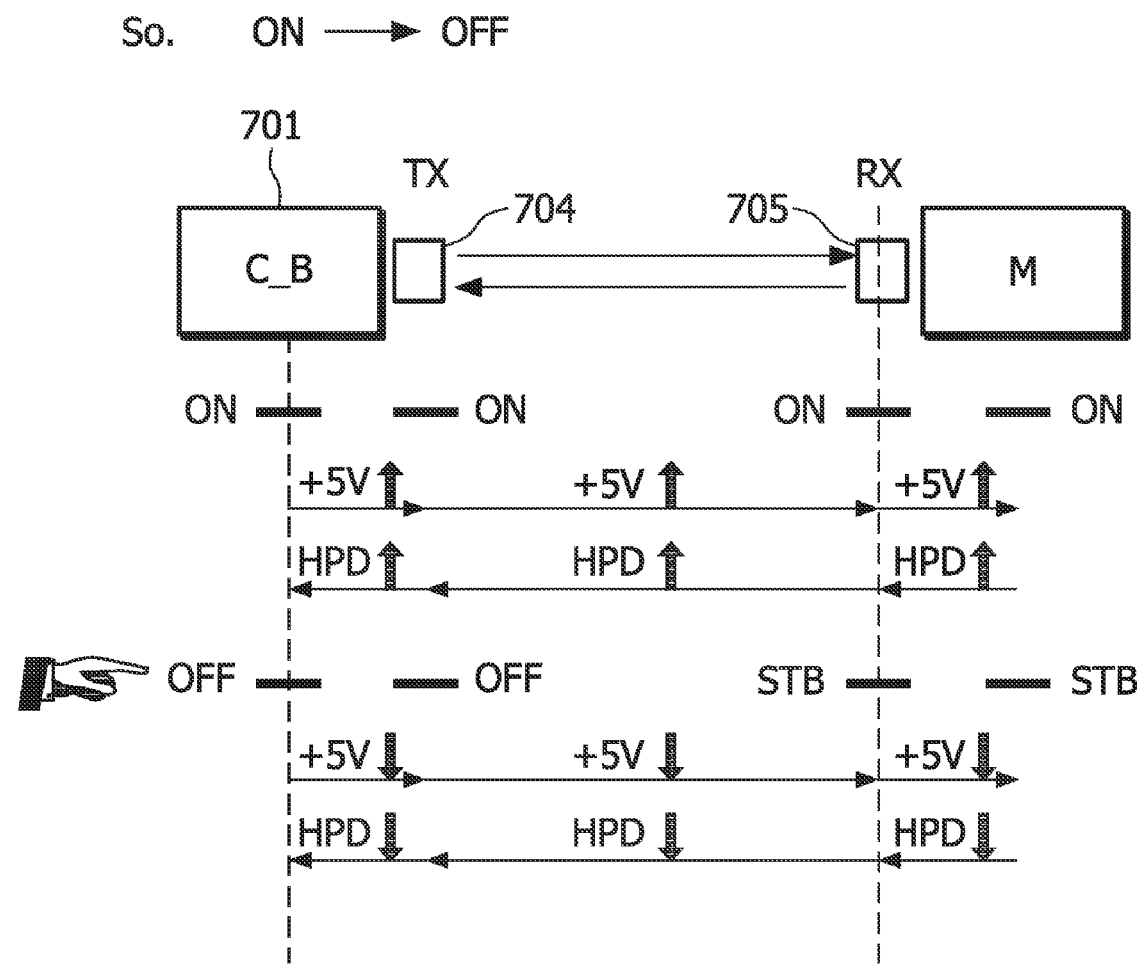

FIG. 11 shows a flow diagram showing the state change of the source, sink and the TX and RX link modules in the case of scenario 4, which can be traced back to table 1. This flow diagram depicts the scenario where the source is switched from an ON power state to an OFF power state. In this case the TX module is switched OFF at the same time as the source device when it is powered through the source device. When instead the TX module is powered through an external AC/DC adapter the TX module will switch to STB.

In case the complete system is in the ON state and the source (connector box (C_B) 701) is switched OFF, the +5V state will not be sent across to the link RX module anymore. On the absence detection of the +5V signal the RX link module will de-assert its +5V signal to the sink and the sink will de-assert its HPD signal.

Figure 12:
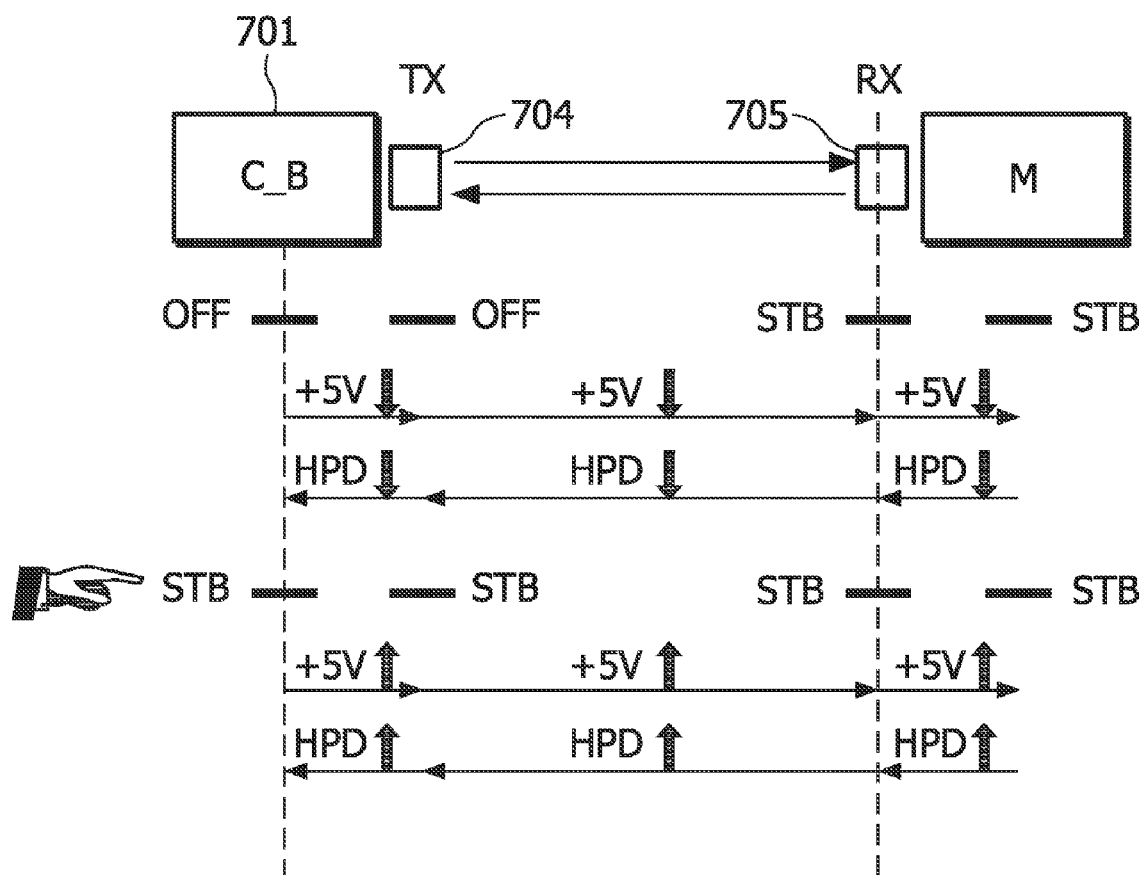

FIG. 12 shows a flow diagram showing the state change of the source, sink and the TX 704 and RX 705 link modules in the case of scenario 5, which can be traced back to table 1. This flow diagram depicts the scenario where the source is switched from an OFF power state to an STB power state, when the sink is in STB power state.

In case the sink is in STB and the source is in the OFF state and is activated, it will default go to the STB state. The TX 704 link module gets the +5V signal asserted and will forward the state of the +5V signal to the RX 705 link module. The RX 705 link module on his turn will assert the +5V signal to the sink. The sink will assert its HPD line and the RX 705 link module will forward the state of the HDP line to the TX 704 link module. The TX 704 link module will on his turn assert the HPD line to the source. The TX 704 and RX 705 link module depending on their capabilities use one of the same mechanisms as described before.

Figure 13:
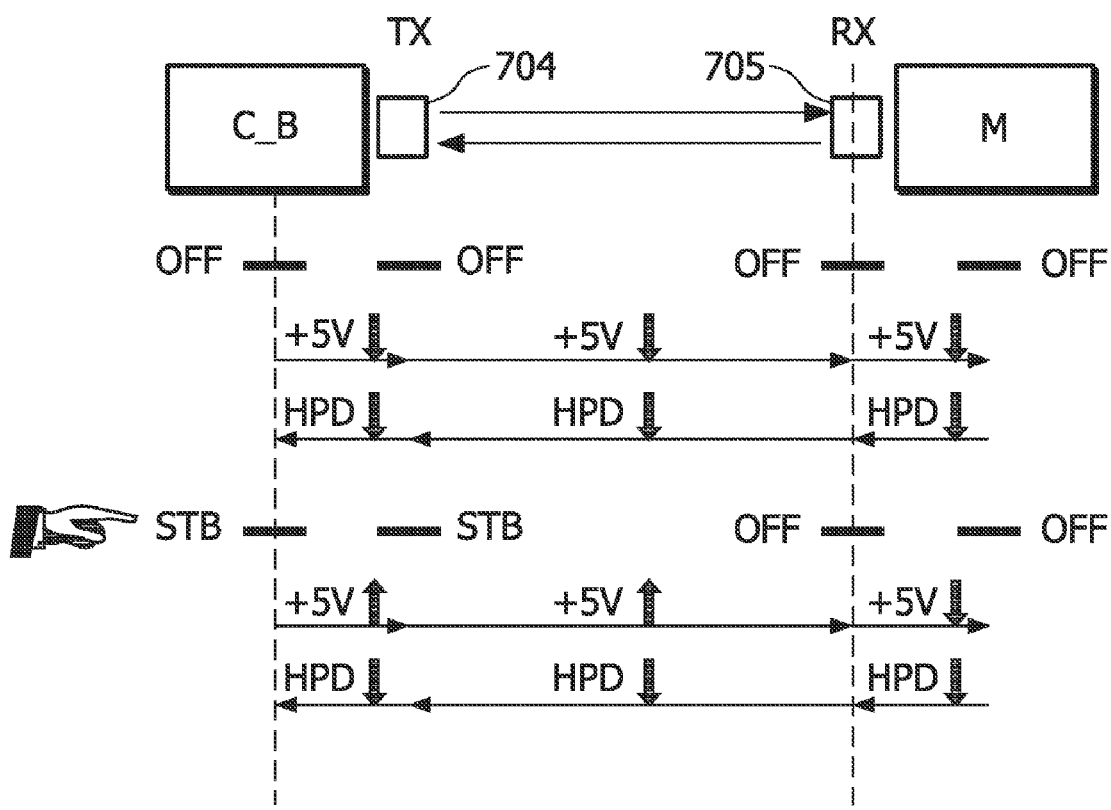

FIG. 13 shows a flow diagram showing the state change of the source, sink and the TX 704 and RX 705 link modules in the case of scenario 6, which can be traced back to table 1. This flow diagram depicts the scenario where the source is switched from an OFF power state to an STB power state, when the sink is in OFF power state.

In case the source and sink are in the OFF state and the source is activated, it will default go to the STB state. The source will assert its +5V line and the TX 705 link module sends the state of the +5V signal across to the RX link module. Since the RX 705 link module is in the OFF state it is not able to receive the state and will also not send the HPD state.

Figure 14:
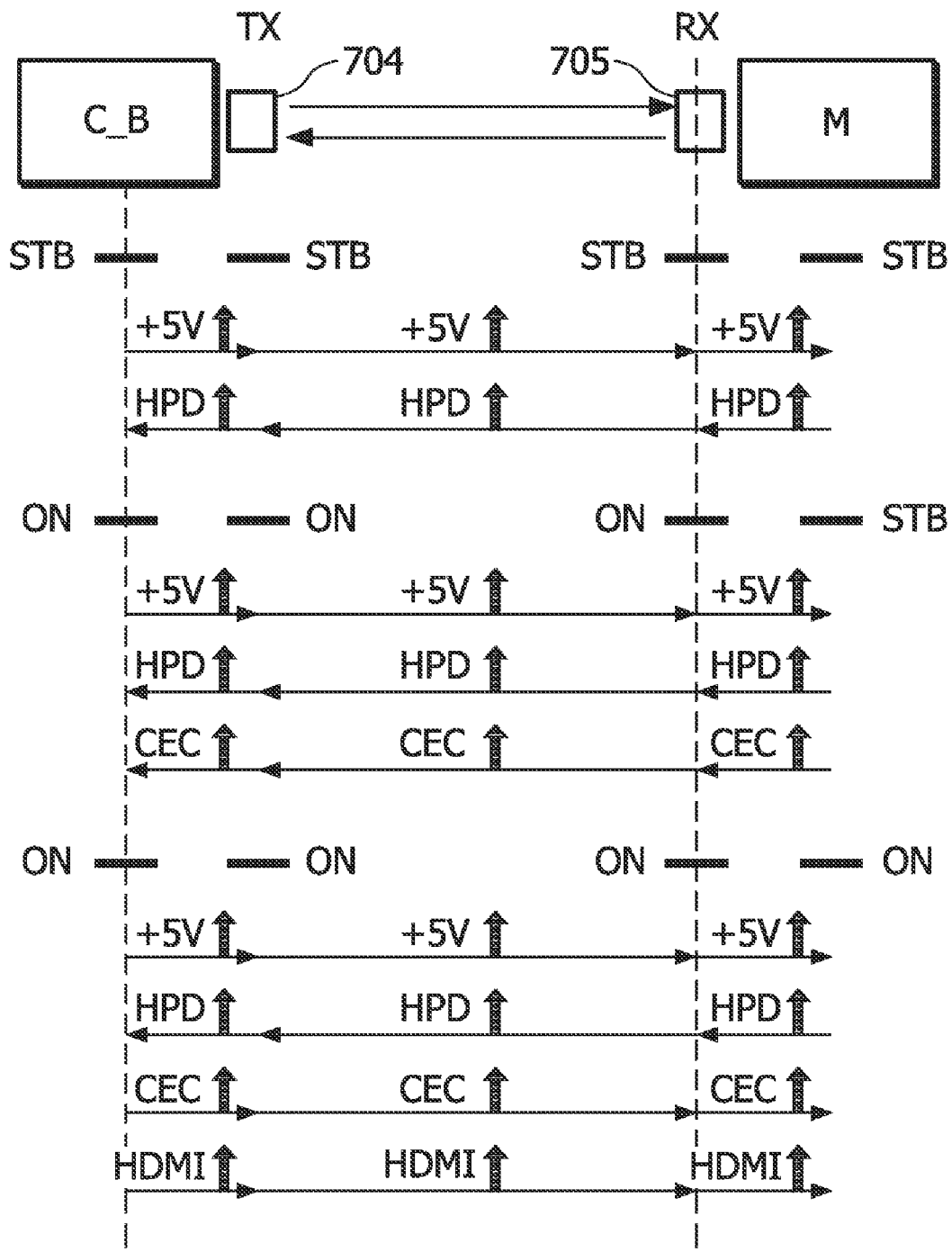

FIG. 14 shows a flow diagram showing the state change of the source, sink and the TX 704 and RX 705 link modules in the case of scenario 7, which can be traced back to table 1.

In case the complete system is in STB and an RC awakeable or local key command is received, the sink will send the RC command enclosed into a vendor specific remote control CEC message to the source. The RX 705 link module get activated by the CEC activity and will send the CEC message to the TX 704 link module. The TX 704 link module on his turn gets activated by the CEC activity and will forward the CEC message to the source. The source receives the CEC messages and interprets the RC command and wakes up. It will send the "image view ON" message, or another message that is defined to switch the sink from STB to ON, to the sink and the sink will wake up on receiving this message. At this point the complete configuration is switched ON and audio/video can be sent across the link as is denoted by HDMI in the diagram.

Figure 15:
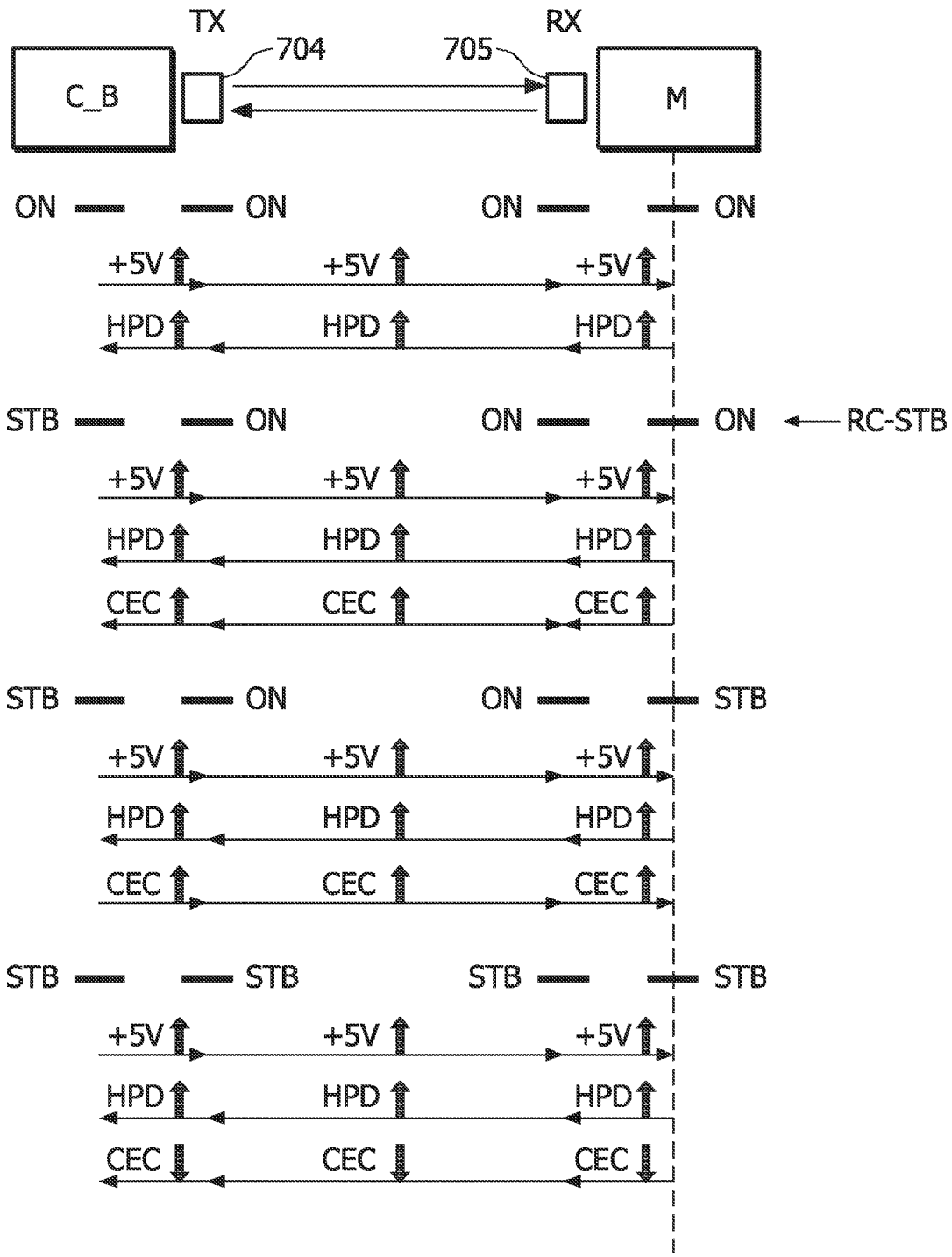

FIG. 15 shows a flow diagram showing the state change of the source, sink and the TX 704 and RX 705 link modules in the case of scenario 8, which can be traced back to table 1.

Figure 16:
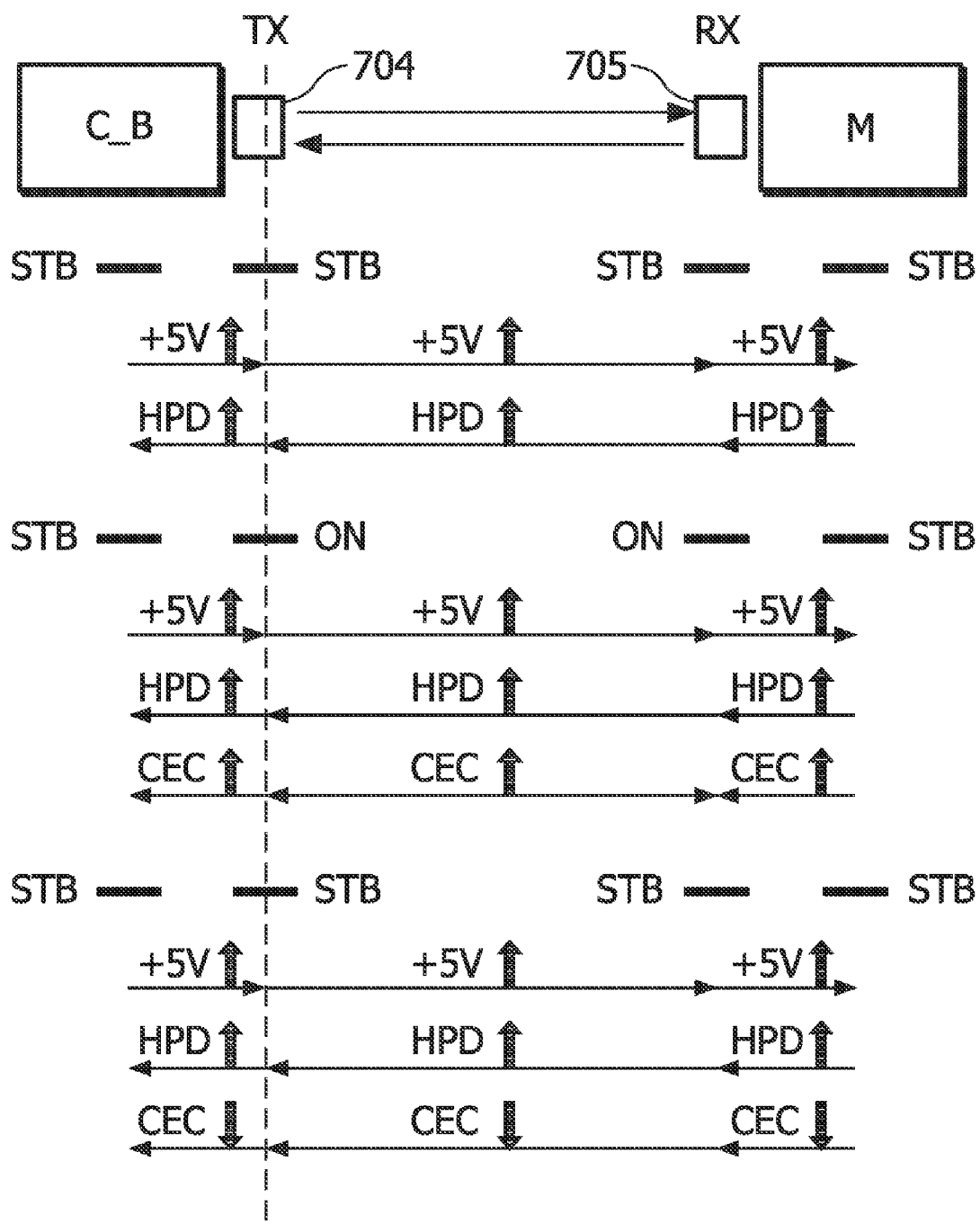

When the complete system is in the ON state and a STB RC command is received by the sink, the sink will forward the RC message to the source enclosed in a vendor specific remote control CEC message. The CEC message is received by the source and interpreted by the source. The source will switch to STB and will send a CEC system standby command to the sink to switch the sink to STB. After switching the source and the sink to STB the TX and RX link modules will switch to STB after a certain time without CEC or audio/video activity. The source, sink and TX and RX link modules will continue to communicate the +5V signal and the HPD signal FIG. 16 shows a flow diagram showing the state change of the source, sink and the TX 704 and RX 705 link modules in the case of scenario 9, which can be traced back to the table listed before In case the complete system is in STB and the sink receive an RC command, which is not in the list of awake-able RC commands, it will send the RC command embedded in a vendor specific remote control CEC message to the source. The RX 705 and TX 704 link module switch ON upon detection of CEC activity and forward the CEC message. The source will interpret the RC command embedded in the CEC message and will detect it is a non awake-able RC command and remains in the STB state. The TX and RX link modules will after a specific time without CEC or audio/video activity will go to back to the STB state.

Certain specific details of the disclosed embodiment are set forth for purposes of explanation rather than limitation, so as to provide a clear and thorough understanding of the present invention. However, it should be understood by those skilled in this art, that the present invention might be practiced in other embodiments that do not conform exactly to the details set forth herein, without departing significantly from the spirit and scope of this disclosure. Further, in this context, and for the purposes of brevity and clarity, detailed descriptions of well-known apparatuses, circuits and methodologies have been omitted so as to avoid unnecessary detail and possible confusion.

Reference signs are included in the claims, however the inclusion of the reference signs is only for clarity reasons and should not be construed as limiting the scope of the claims.

The invention claimed is:

1. A method of detecting and controlling the power states in a multimedia system, the system comprising a multimedia connector box (201) including a multimedia source (203) interconnected to a transmitter module (204) and a multimedia device (202) including a receiver module (205) interconnected to a multimedia sink (206), wherein the transmitter and the receiver modules (204, 205) are interfaced via multimedia interfacing means (210), and wherein the transmitter module (204) is capable of having a power state which is different to a power state of the multimedia source (203), the method comprising:
on the connector box (201) side;
determining (101) the power state of the multimedia source (203),
switching (103) the power state of the transmitter module (204) to the same power state as determined for the multimedia source (203),
wherein information indicating the current power state of the multimedia source (203) is provided (105) to the receiver module (205); and
on the multimedia device (202) side;
switching (107) the power state of the receiver module (205) to the same power state as determined for the multimedia source (203).

2. A method according to claim 1, wherein the receiver module (205) is capable of having a power state which is different to a power state of the multimedia sink (206), the method further comprising:
on the multimedia device side (202);
determining the power state of the multimedia sink (206),
switching the power state of the receiver module (205) to the same power state as determined for the multimedia sink (206),
wherein information indicating the current power state of the multimedia sink (206) is provided to the transmitter module (204); and
on the connector box side (201);
switching the power state of the transmitter module (204) to the same power states as determined for the multimedia sink (206).

3. A method according to claim 1, wherein the step of providing information to the receiver module (205) indicating the current power state of the multimedia source (203) comprises transmitting data indicating the current power state of the multimedia source (203) to the receiver module (205).

4. A method according to claim 1, wherein the step of providing information to the receiver module (205) indicating the current power state of the multimedia source (203) is based on the signal activity at the transmitter module (204) or the multimedia source (203), wherein the receiver module (205) is adapted to automatically detect the signal activity and based thereon determined the current power state of the transmitter module.

5. A method according to claim 2, wherein the step of providing information to the transmitter module (204) indicating the current power state of the multimedia sink (206) comprises transmitting data indicating the current power state of the multimedia sink (206) to the transmitter module (204).

6. A method according to claim 2, wherein the step of providing information to the transmitter module (204) indicating the current power state of the multimedia sink (206) is based on the signal activity at the receiver module (205) or the multimedia sink (206), wherein the transmitter module (204) is adapted to automatically detect the signal activity and based thereon determined the current power state of the receiver module.

7. A method according to claim 1, wherein the step of determining the power state comprises detecting the signal activity either on the High-Definition-Multimedia-Interface Transition-Minimized-Differential-Signaling (HDMI TMDS) lines, the clock line or the Consumer Electronics Control (CEC) line.

8. A method according to claim 2, wherein the step of determining the power state comprises detecting the signal activity either on the High-Definition-Multimedia-Interface Transition-Minimized-Differential-Signaling (HDMI TMDS) lines, the clock line or the Consumer Electronics Control (CEC) line.

9. A method according to claim 1, wherein the step of determining the power state of the transmitter module and accordingly the multimedia source (203) comprises detecting the signal activity (209*a*) between the transmitter module (204) and the receiver module (205).

10. A method according to claim 6, wherein the step of determining the power state of the receiver module and accordingly the multimedia sink (203) comprises detecting the signal activity (209b) between the receiver module (204) and the transmitter module (206).

11. A method according to claim 10, wherein if the detected signal activity results that no activity is detected over a predefined time interval the power state of the power sources is determined to be in stand-by state (STB) or off state (OFF), otherwise the power state of the power sources is determined to be in on state (ON).

12. A computer readable media for storing instructions for enabling a processing unit to execute the method steps in claim 1.

13. A communication protocol arranged to implement a power control of a multimedia system comprising a multimedia connector box including a multimedia source interconnected to a transmitter module (204) and a multimedia device including a receiver module (205) interconnected to a multimedia sink (206), wherein the transmitter and the receiver modules (204, 205) are interfaced via multimedia interfacing means (210), and wherein the transmitter module (204) is capable of having a power state which is different to a power state of the multimedia source (203) and wherein the receiver module (205) is capable of having a power state which is different to a power state of the multimedia sink (206), wherein information indicating the current power state of the multimedia source (203) are provided to the receiver module (205), or vice versa, information indicating the current power state of the multimedia sink (206) are provided to the transmitter module (204), wherein the information are used for harmonizing the power mode of the system.

14. A communication protocol according to claim 13, wherein the information is provided by sending +5V signal state and a HPD signal state across the optically or wirelessly medium.

15. A system (220) adapted for detecting and controlling the power states in a multimedia system, the system comprising a multimedia connector box (201) including a multimedia source (203) interconnected to a transmitter module (204) and a multimedia device (202) including a receiver module (205) interconnected to a multimedia sink (206), wherein the transmitter and the receiver modules (204, 205) are interfaced via multimedia interfacing means (210), wherein the transmitter module (204) is capable of having a power state which is different to a power state of the multimedia source (203) and wherein the receiver module (205) is capable of having a power state which is different to a power state of the multimedia sink (206), the system comprising:
on the connector box side (201);
    a power detector (207a) adapted to determine the power state of the multimedia source (203),
    a switching mechanism (208a) adapted to switch the power state of the transmitter module (204) to the same power state as determined for the multimedia source (203),
wherein information indicating the current power state of the multimedia source (203) is provided to the receiver module (205);
on the multimedia device side (202);
    a switching mechanism (208b) adapted to switch the power state of the receiver module (205) to the same power state as determined for the multimedia source (203).

16. A system according to claim 15, further comprising:
on the multimedia device side (202);
    a power detector (207b) adapted determine the power state of the multimedia sink (206);
wherein the switching mechanism (208b) is adapted to switch the power state of the receiver module (205) to the same power state as determined for the multimedia sink (206), wherein information indicating the current power state of the multimedia sink (206) are provided to the transmitter module (204).

17. A system according to claim 15, wherein the multimedia interfacing means comprises High-Definition-Multimedia-Interface (HDMI), or digital uncompressed video and audio interfacing means.

18. A system according to claim 15, wherein the transmitter and receiving modules are connector together either optically or wirelessly.

19. A system according to claim 15, further comprising a stand-by mechanism implemented in the connector box and display and which is independent of the multimedia interfacing means (210) and the transmitter and the receiver modules (204, 205), wherein either the connector box or the display takes up the role as master and where the master puts the slave in standby by using a predefined handshake mechanism over a predefined communication protocol.

20. A system according to claim 15, wherein the connector box acts (201) as a master and multimedia device (202) as a slave.

21. A system according to claim 15, wherein a handshake is used to go to stand-by mode and to come out of the stand-by mode.

22. A mechanism (200a, 200b) adapted to be implemented in a multimedia system for controlling the power states in the system, the system comprising a multimedia connector box (201) including a multimedia source (203) interconnected to a transmitter module (204) and a multimedia device (202) including a receiver module (205) interconnected to a multimedia sink (206), wherein the transmitter and the receiver modules (204, 205) are interfaced via multimedia interfacing means (210), and wherein the transmitter module (204) is capable of having a power state which is different to a power state of the multimedia source (203) and wherein the receiver module (205) is capable of having a power state which is different to a power state of the multimedia sink (206), the mechanism comprising:
    a power detector (207, 207b) adapted to detect the power state of the multimedia source or sink (203, 206), and
    a power switching mechanism (208a, 208b) adapted to switch the power state of the transmitter or receiver modules (204, 205) to the same power state as detected for the multimedia source or sink (203, 206).

23. A mechanism according to claim 22, wherein the mechanism is further adapted to send +5V signal state and Hot-Plug-Detect (HPD) signal state across the multimedia interfacing means.

24. A method performed in a mechanism (200a, 200b), where the mechanism (200a, 200b) is adapted to be implemented in a multimedia system for controlling the power states in the system, the system comprising a multimedia connector box (201) including a multimedia source (203) interconnected to a transmitter module (204) and a multimedia device (202) including a receiver module (205) interconnected to a multimedia sink (206), wherein the transmitter and the receiver modules (204, 205) are interfaced via multimedia interfacing means (210), and wherein the transmitter module (204) is capable of having a power state which is different to a power state of the multimedia source (203) and wherein the receiver module (205) is capable of having a power state which is different to a power state of the multimedia sink (206), the method comprising:
    detecting the power state of the multimedia source/sink (203, 206), and
    switching the power state of the transmitter/receiver modules (204, 205) to the same power state as detected for the multimedia source/sink (203, 206).

* * * * *